United States Patent [19]

Sandefur et al.

[11] Patent Number: 4,673,410

[45] Date of Patent: Jun. 16, 1987

[54] ANIONIC DYE DISPERSIONS WITH ENHANCED COLD WATER SOLUBILITY UPON DILUTION

[75] Inventors: Charles W. Sandefur; Thomas J. Thomas, both of Summerville, S.C.

[73] Assignee: Mobay Corporation, Pittsburgh, Pa.

[21] Appl. No.: 799,672

[22] Filed: Nov. 19, 1985

[51] Int. Cl.$^4$ .............................................. C09B 67/00
[52] U.S. Cl. ........................................ 8/528; 8/527; 8/589; 8/597; 8/599; 8/680; 8/937
[58] Field of Search ........................... 8/528, 597, 599

[56] References Cited

U.S. PATENT DOCUMENTS

| | | | |
|---|---|---|---|
| 3,770,371 | 11/1973 | Bossard et al. | 8/598 |
| 3,963,418 | 6/1976 | Tullio | 8/564 |
| 4,014,646 | 3/1977 | Tullio | 8/602 |
| 4,110,073 | 8/1978 | Mollet et al. | 8/649 |
| 4,264,323 | 4/1981 | Capponi et al. | 8/527 |
| 4,435,181 | 3/1984 | Hoguet et al. | 8/527 |
| 4,465,491 | 8/1984 | Balliello et al. | 8/524 |
| 4,468,230 | 8/1984 | Thomas et al. | 8/528 |
| 4,487,610 | 12/1984 | Mausezahl | 8/524 |
| 4,567,171 | 1/1986 | Mangum | 8/552 |

*Primary Examiner*—A. Lionel Clingman
*Attorney, Agent, or Firm*—Gene Harsh; Lawrence S. Pope

[57] ABSTRACT

The present disclosure is concerned with enhancing the solubility of dispersed anionic dyes upon the dilution of their dispersions with room temperature water. Concentrated dispersions of such dyes with acceptable stability and low shear viscosities are disclosed which are more readily diluted to dissolve the dispersed dyestuff because they contain certain chelating agents are described. These agents have at least one free or appropriately neutralized acid group, with carboxylic acid groups being preferred. The appropriae cations include ammonium or lithium ions. The free acid groups are subsequently neutralized with these appropriae cations so that the final dispersions are preferably about neutral, i.e have pH values about 7. A further improvement to the dilutability by the addition of a surfactant, preferably a non-ionic surfactant, is also discssed. The preferred dispersions dilute to a solution free of particles visible to the unaided human eye within three minutes of being combined at a rate of three grams of dispersion per liter of room temperature water.

15 Claims, No Drawings

ANIONIC DYE DISPERSIONS WITH ENHANCED COLD WATER SOLUBILITY UPON DILUTION

SUMMARY OF THE INVENTION

The present invention is concerned with improving the solubility of anionic water soluble dyes, including acid, direct and reactive dyes, which are dispersed in an aqueous medium. The solubility of these dyes, particularly in cold water, is enhanced by adding a chelating agent which has at least one of a free acid group or a lithium or organic carboxylate group to such a dispersion. The pH of the dispersion is controlled to a value in excess of about 5 by the addition of an appropriate amount of a lithium or organic cation source. The combination of chelating agent and cation source is present in an amount sufficient to give the dispersion a three minute solubility of at least about 5 grams per liter at 25° C. This means that upon diluting 5 grams of the dispersion with one liter of 25° C. water no dye particles are observable within about three minutes.

The dispersions are formulated to be stable non-sedimenting and concentrated while still having a low viscosity at low shear rates. They thus contain between about 10 and 60 weight percent of dispersed dyestuff which has an average particle size of between about 1 and 5 microns with no substantial portion having a particle size less than about 1 micron. The water content is set to provide a room temperature viscosity of less than about 4000 cps in a Brookfield viscometer at 12 rpm.

BACKGROUND OF THE INVENTION

There has been interest in both making dyes available in liquid formulations and enhancing the water solubility of dyes which dissolve in the dye bath. Approaches to the former object have been concentrated dye solutions in water/organic solvent mixtures and the development of aqueous dye dispersions and one approach to the latter object has been the addition of the tetrasodium salt of ethylene diamine tetra acetic acid (EDTA) or glycine to an ultimately spray dried formulation. There is also interest in enhancing the water solubility, especially the cold water solubility, of dispersed water soluble dyes.

The aqueous dye dispersion approach was proposed for both cationic and anionic dyes in U.S. Pat. No. 3,770,371. Basically, these water soluble dyes are driven out of solution by the addition of selected electrolytes and the dispersion is stabilized by the addition of a dispersant. A modification in which either acid or reactive dyes are driven out of solution by supersaturation of the water dispersion medium which contains suitable anionic dispersants was proposed in U.S. Pat. Nos. 4,110,073 and 4,264,323, respectively. Both of these patents also taught extensive size reduction of the dye particles to be dispersed. Later refinements taught in U.S. Pat. Nos. 4,435,181 and 4,468,230 resulted in dispersions of reactive and acid dyes, respectively, which had commercially attractive low shear viscosities. Another approach taught in European Patent Publication No. 0,123,654 is to replace the anionic dispersants recommended and exemplified in the prior teachings of such dispersions with oligomeric to polymeric ethylene oxide derived non-ionic dispersants. However, the literature dealing with these dispersions seems to have assumed that adequate dye solubility would be observed upon diluting the dispersions shown to the dye concentrations typical of the baths used to apply the dye to the goods to be colored.

There is a need to enhance the rate and extent of solution observed when anionic dye dispersions are diluted for final use. For instance, some nylon fibers used in carpets begin fixing dye at room temperature so that the cold water solubility observed on the dilution of acid dye dispersions is of concern. If the dye does not quickly and completely dissolve, non-uniform dyeings may result. Some areas of the carpet may be deeply colored while others are inadequately colored. Furthermore, in many cases the dye is ultimately fixed by a steam treatment so that heating of the dye bath is conducted only to the extent necessary to fully dissolve the dyes. Therefore, there is also a desire by dyers for dispersions that only require dilution without heating for conversion to solutions. However, because the dye fixation is from a truly dissolved state, the concern is with essentially particle free solutions as opposed to apparent solutions determined by various filtration tests. A convenient test is the visual appearance of the "solution" in a strong light which is hereinafter referred to as "visual solubility".

The concentrated dye solutions of certain anionic dyes has been discussed in U.S. Pat. Nos. 3,963,418 and 4,014,646. In these cases high dye solubility in an aqueous medium is achieved by the use of an organic cosolvent and the avoidance of sodium cations. In the typical production of anionic dyes the water solubilizing group is an acid group neutralized with sodium, but here the sodium is carefully displaced with lithium or ammonium cations. The stability of these solutions to dilution with hard water is assured by the addition of certain carboxylic acid bearing chelating agents to complex or sequester those metal ions such as calcium and magnesium whose presence in hard water causes precipitation of the dissolved dye. In order to avoid introducing sodium ions it is suggested that these chelating agents be added in their free acid forms.

The use of the free acid forms of chelating agents to form metal complex dyes, particularly trivalent chromium complexes, has been discussed in U.S. Pat. No. 3,305,539. Although it is indicated that the chelate enhances solubility, it is readily apparent from the sodium hydroxide neutralization taught in the working examples that this enhanced solubility is associated with the formation of a particular structure complex and not the initial absence of sodium or potassium counterions.

Spray dried dye powder of selected anionic dyes diluted with substantial amounts of an anionic dispersant in which the cold water "solubility" has been enhanced by the addition of tetrasodium EDTA or glycine is disclosed in U.S. Pat. Nos. 4,465,491 and 4,487,610 and European Pat. No. 57,158. The "solubility" is evaluated by the presence or absence of residue on SS 1450 CV filter paper. Evidently, the "solutions" were not optically evaluated for the absence of observable particles. The filter paper is coarse enough to allow the passage of some particles which would be trapped by finer filter paper such as Whatman No. 2. What is actually obtained appears to be a readily "dispersible" powder, i.e. a powder which forms a fine filterable dispersion on addition to limited quantities of cold water.

There does not appear to be a teaching of how to improve the solubility of aqueous dispersions of sodium neutralized anionic dyes. Although replacement of the sodium ctions with lithium or ammonium might appear to be helpful it is undesirably expensive to obtain commercial quantities of many anionic dyes in other than their sodium salt form, and it is not at all clear that either stable dispersions or solutions with acceptable properties could be made with such modified materials. The addition of tetrasodium EDTA has not been found helful in improving the "visual" solubility of such dispersions.

There is thus a need for aqueous dispersions of anionic sodium neutralized dyes in which the dyes readily dissolve upon dilution of the dispersion with cold water to the dye strengths typically encountered in application baths. In particular, there is a need for dispersions wherein dilution to concentrations of about 5 grams per liter or less results in the absence of visible particles of dye in about three minutes or less.

DETAILED DESCRIPTION OF THE INVENTION

The aqueous dispersions of the present invention are most broadly defined as those which contain between about 10 and 60 weight percent of anionic dye and the requisite amounts of the remaining components to meet the criteria of stability, solubility and viscosity. Preferably the dispersions contain between about 15 and 50 weight percent of dye and more preferably contain between about 20 and 30 weight percent. In this regard, the water solubility of the dyestuff has been ignored in dicussing the solids content of the dispersions because the amount which does into solution is insignificant. The preferred amount of chelating agent is between about 1 and 25 weight percent with between about 1 and 15 weight percent being more preferred and between about 2 and 10 weight percent being especially preferred. The amount of cation source is controlled by the amount and state of the chelating agent and the acidity or basicity of the dye source used. If the chelating agent is added in its free acid form, more cation source will be required than if a partially or fully neutralized chelating agent is utilized. Similarly, more cation source will be required if the dye is obtained from an acidic as opposed to a basic presscake. It is preferred to use sufficient cation source to give the final dispersion a pH in excess of about 6.0, more preferably in excess of about 7.0. An approximately neutral (pH 7) dispersion is especially preferred but dispersions with pH values less than about 12 are of particular interest. The final water content of the dispersion is such that the low shear room temperature viscosity is less than about 4000 cps but it is preferred that this viscosity be less than about 3000 cps. However, if the viscosity is lower than desired, it can be increased by known agents such as xanthan gum rather than decreasing the water content. The dispersion may also contain dispersant in addition to that required to prevent reagglomeration of the dye during size reduction of the dye particles. Between about 0.2 and 2.0 weight percent, based on the final dispersion, of dispersant is preferably used to prevent reagglomeration during size reduction with between about 0.5 and 1.5 weight percent being particularly preferred. The amount of additional dispersant is preferably less than about 10 weight percent with 5 weight percent or less being particularly preferred. A range of between about 0.5 and 3.0 is of particular interest in further enhancing the dye solubility on dilution of the dispersion.

The dyes suitable for use in the dispersions of the present invention are those which can contain anionic water solubilizing groups obtained by the neutralization of an acid group with sodium or potassium. These include those anionic dyes classified as acid, direct and reactive. The acid dyes are well known to the art for the colorization of wool and nylon fibers. They are typically characterized by reasonable substantivity for wool or nylon and a solubility in the purified state in boiling water of in excess of about 5 grams per liter, preferably in excess of about 20 grams per liter. Those which achieve substantitivy without either a mordant or complexing with a metal ion are preferred.

The dyes suitable for use in the dispersions of the present invention are those which contain anionic water solubilizing groups obtained by the neutralization of an acid group sodium or potassium. These include those in the acid, direct and reactive usage classifications set forth in the *Colour Index,* Third Edition, published by the Society of Dyers and Colourists, and also recognized in Volume 8 of the Third Edition of the *Kirk-Othmer Encyclopedia of Chemical Technology* at pages 160 to 169. Those dyes bearing neutralized sulphonic acid groups are preferred and monosulphonated dyes are particularly preferred. The present invention finds particular advantage with those dyes which display limited water solubility in the actual application bath at room temperature such as those monosulphonated level and neutral dyeing acid dyes which do not readily and rapidly go into solution in the baths typically used for the continuous dyeing of nylon carpet. The present invention, however, finds utility in any situation in which any anionic dyestuff dispersion is diluted to cause dissolution of the dispersed dye in an aqueous medium under conditions which do not result in rapid and complete dissolution.

The monosulphonated level dyeing and neutral dyeing acid dyes so classified by *Kirk-Othmer* constitute a preferred class of dyes for use in practicing the present invention. Especially preferred among these dyes are those which are either azo or anthraquinone dyes. Particularly preferred dyes of these types are the following Color Index Acid dyes:
Blue 25
Blue 40
Blue 324
Orange 156
Red 266
Red 337

The single most preferred dye has the following structural formula

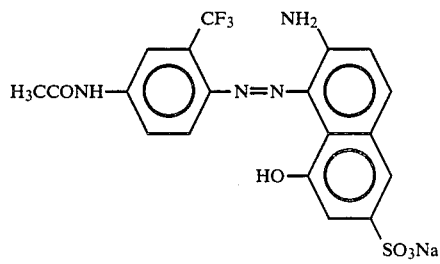

The chelating agents suitable for the practice of the present invention include any of those known as such to the art which carry at least one acid group which is unneutralized or neutralized with an appropriate cation.

The appropriate cations are lithium or the organic cations known to the art such as ammonium groups with the lithium and ammonium, particularly trialkyl ammonium such as triethanolamine derived cations being preferred and lithium being the most preferred. An extensive description of suitable chelating agents can be found at page 339 et seq of Volume 5 of the Third Edition of *Kirk-Othmer Encyclopedia of Chemical Technology*. The preferred chelating agents are those which carry carboxyl or carboxylate groups and particularly preferred are those with at least three such groups. Especially preferred among these at least tricarboxylic acids are citric acid and the aminocarboxylic acids such as nitriloacetic acid, hydroxy ethylethylene diamine triacetic acid, diethylene triamine pentaacetic acid and ethylenediamine tetraacetic acid (commonly called EDTA). Suitable amino di-, tri- and tetra-carboxylic acids are described in U.S. Pat. Nos. 4,465,491 and 4,487,610 incorporated herein by reference. The most preferred chelating agent is EDTA.

The chelating agents can be used in their free acid form or partially or fully neutralized. It is preferred that none of the chelating agents' acid groups be neutralized with sodium or potassium but such partially neutralized agents are suitable provided they also have at least one either free or appropriately neutralized acid group. If the chelating agent is used in an at least partially free acid form it may be necessary to add a sufficient amount of an appropriate base to adjust the pH of the final dispersion to a value in excess of about 5.

The appropriate bases are any of those which generate or liberate an appropriate cation in an acidic aqueous medium. The appropriate cations have been described hereinabove and particularly include the lithium ion and trialkyl-substituted ammonium groups. Suitable bases thus include lithium hydroxide, lithium hydroxide monohydrate, triethylamine and triethanolamine. Also included are the salts of weaker acids which will liberate cations in the presence of a stronger acid, e.g. lithium carbonate.

The final dispersion may be prepared in a variety of ways, and the necessary ingredients may be added in any appropriate order. In a preferred technique the dyestuff is slurried with water and size reduced to give a particle size distribution with an average value between about 1 and 5 microns (as determined by Coulter counter) before the addition of the chelating agent. The common size reduction techniques generate heat which typically raises the temperature of the aqueous medium being processed. In order to avoid the dissolution of any significant amount of the dyestuff being processed, it is desirable to make any additions which enhance the solubility of the dyestuff after this operation is completed. For the same reason, it may be advantageous to use a lower water content or a higher dye concentration during the size reduction and subsequently dilute back to the final desired concentration. In such a procedure it is normally necessary to add a small amount of a dispersing agent before or during size reduction to retard or prevent reagglomeration of the material being size reduced.

The dispersant used to prevent such reagglomeration is typically an anionic dispersant. Suitable anionic dispersants are those the art recognizes as such by virtue of having a molecular structure wherein a portion of the molecule is particularly compatible with organic material and a portion of the molecule, the anionic group, is particularly compatible with water. The preferred dispersants are those which carry carboxylate or sulphonate groups. Particularly preferred dispersants are those that contain one or more sulphonate groups particularly those in which the counter ion is an alkali metal, and most especially those in which the counter ion is sodium. Especially preferred dispersants are the sulphonated condensation products of naphthalene and formaldehyde and the lignin sulphonates with the latter being the most preferred. Particularly suitable are the lignin sulphonates or derivatives thereof which are sodium salts; have low or no sugar content; have molecular weights between 5000 and 50,000; and have between 0.5 and 5 sulphonic acid groups per 1000 molecular weight units. Especially preferred lignin sulphonates are the non-staining variety which do not impart substantial coloration to an undyed skein.

Other suitable dispersants include: alkyl sulphonates; sulphonated, unsaturated, fatty acids; sulphonates of polycarboxylic acid esters; alkyl benzene sulphonates; sulphonated aliphatic alcohol; condensation products of ethylene oxide with amines, fatty acids, phenols or alcohols which are then reacted with sulfuric acid and neutralized to form salts which will dissociate in water to give anions. Specific examples of suitable dispersants include sodium dodecylsulphonates, sodium lauryl sulfates, sodium dodecylbenzene sulphonate, dibutyl naphthylene sulphonate, acidic sulfuric acid esters of the condensation products of ethylene oxide with nonyl phenol, sodium dioctylsulfosuccinate, condensation products of cresol, $NaHSO_3$ and formaldehyde, condensation products of 2-hydroxy naphthylene-6-sulfonic acid with formaldehyde, sulphonic acids of condensation products of naphthylene, terphenyl or ditolylether with formaldehyde and condensation products of cyclohexanone with formaldehyde and $NaHSO_3$. All of these anionic dispersants are preferably used as their alkali and/or ammonium salts.

One of these same dispersants may also serve as the anionic dispersant required to maintain the final dispersion. The art, such as U.S. Pat. Nos. 4,435,181 and 4,468,23 has recognized the need for a certain amount of dispersant to maintain a dispersed anionic dyestuff in an aqueous dispersion.

The dispersions of the present invention may also contain dispersant additional to that necessary to both prevent agglomeration during size reduction and maintain the final dispersion against separation in order to further enhance dye solubility upon water dilution of the dispersion. In this case, however, it is preferred to utilize non-ion surfactants. These materials are similar to the anionic dispersants in having a molecular portion particularly compatible with organic materials but dissimilar in having a water compatible portion derived from ethylene oxide derived polyether sequences. The readily available anionic dispersants are commonly sodium or potassium salts. It is believed that sodium and potassium ions tend to limit the water solubility of anionic dyes so it is preferred to limit their constant insofar as it is practical and possible. The non-ionic surfactants, althouh undesirably inefficient in preventing agglomeration during size reduction, are paricularly effective in enhancing the solubility on dilution presumably because they do not contribute sodium or potassium ions to the aqueous medium. In the systems of present interest, in obtaining the desired degree of dispersing effect, the non-ionic surfactants impart an undesirable high viscosity to the dispersion. However, in the presence of the anionic dispersants they can be used to beneficially effect the dispersed dye's apparent solubility without an adverse effect on viscosity.

The suitable non-ionic surfactants are well known to the art as such and include the non-ionogenic stabilizers described in U.S. Pat. No. 3,770,371, incorporated by reference herein, and the non-ionic dispersing agents described in U.S. Pat. No. 4,110,073, incorporated herein by reference. The preferred non-ionic surfactants are those ethoxylation products which do not carry the residues of other alkylene oxides such as propylene oxide. Particularly preferred are the ethoxylation products of low molecular weight alcohols or phenols, most especially ethoxylated oleyl alcohol and nonylphenol. Ethoxylation degrees of between about 8 and 50, particularly between 9 and 25, are also especially preferred.

The dispersions of the present invention preferably have a low content of sodium and potassium ions. As discussed hereinabove, it is believed the presence of excessive levels of these ions may inhibit the solubility of the dispersed dyes on water dilution of the dispersions, particularly if the dilution is with cold or room temperature water. Thus, it is preferred to use the minimum amount of sodium or potassium salt dispersants needed and to minimize the level of sodium or potassium salt electrolytes present.

Many of the commercially available anionic dyes will impart a certain sodium ion content to an aqueous dispersion both because they are recovered from their synthesis baths as sodium salts and because they are isolated with some electrolytes such as sodium chloride and sodium sulphate. It is technologically difficult and economically undesirable to purify these dyes and it is even more of a problem to replace the sodium counterions they carry. In certain cases not relevant to the present invention, anionic dyes have been prepared with lithium or ammonium counterions and formulated as supersaturated aqueous solutions for use in the paper industry. But the present invention is concerned with improving the apparent solubility characteristics of anionic dyes which are prepared as dispersions as opposed to solutions. In such liquid formulations there is inadequate jsutification for modifying the counterion.

The sodium and potassium electrolyte content of the dispersions of the present invention should be minimized. It is preferred to avoid the deliberate addition of any such electrolytes.

The dispersions of the present invention should have sufficiently low viscosities at low shear rates to be readily pourable, pumpable and handeable by the end user. For example, such products are typically supplied to the market in drums so that it is neither practical nor convenient to apply significnat shear to the product before emptying the drum. Many other operations which could typically be involved in the end use of the dispersions of the present invention indicate the need for a low viscosity at low shear rates, including any operation involving gravity feeding of the dispersion to an application process. The viscosity of the dispersions of the present invention may be conveniently measured in the Brookfield Model LVT Viscometer at a fairly low shear rate. Such low shear rates are typically obtained by utilizing fairly low spindle speeds of less than about 30 rpm. Almost invariably the lower the spindle speed the lower the shear and consequently the higher the viscosity. A speed of 12 rpm is felt to provide a realistic approximation of field conditions. In particular, the dispersions of the present invention should have room temperature viscosities at 12 rpm of less than about 4000 cps. Such viscosities characterize dispersions which are readily utilizable in the typical field application for anionic dyestuffs, especially acid dyes.

The techniques taught in U.S. Pat. No. 4,468,230 for obtaining the desired low shear viscosities are generally applicable to the dispersions of the present invention. Particularly important among these techniques is the careful control of the particle size distribution of the dispersed dyestuff. Of course, to the extent possible in obtaining stable low viscosity dispersions of the desired dye strength the addition of sodium or potassium electrolytes should be avoided in applying the teachings of this patent. Furthermore, it is preferred in the present invention not to adjust the pH with sodium or potassium ion generators such as sodium hydroxide. In contrast to the U.S. Pat. No. 4,468,230 pH adjustments are preferably made using bases which release cations of the type described hereinabove for neutralization of the chelating agent.

The dyestuffs utilized in the present invention should be gground until they have a median particle size between about 1 and 10 microns, preferably between about 1 and 5 microns, and a grinding technique should be utilized which avoids the generation of a substantial number of particles having sizes below 1 micron. It has been found that aqueous dispersions containing substantial amounts of particles with sizes less than 1 micron display excessive low shear viscosities, particularly when such aqueoud dispersions also contain sufficient dispersant or surfactant to ensure the long term stability of the dispersoin. An appropriate particle size distribution can be obtained by subjecting presscake to sequential grinding in a rotor stator mill followed by grinding in a pressure cavitational mill such as is marketed by the Gaulin Corporation. In general, milling in a sand or glass bead mill will result in the generation of unsuitably small particles. A convenient way to prepare dyestuff presscake for grinding or milling is to stir it into an aqueous solution of the dispersant which will form part of the ultimate dispersion.

The low shear viscosities of the dispersions of the present invention can be adjusted through control of the dyestuff content and the dispersant content. The higher the dyestuff solid content of the dispersion is the higher the viscosity will be if the other parameters are kept constant.

Dispersion viscosity initially decreases with the addition of a dispersant. Once a minimum value is reached, further additions cause an increase. The dispersant content which corresponds to this minimum varies depending on the identity and amount of the dyestuff present. The minimum is typically observed at a dispersant content of between about 0.2 and 5 wt %.

The viscosities of the dispersions of the present invention can also be adjusted by the use of art recognized "thickening agents". The thickening agent may serve the dual purposes of adjusting the low shear vivscosity and stabilizing the dispersion against settling. The thickening agent can also act to suppress the dispersions tendency to stratify or separate into various layers. Although not required for the purposes of the present invention, a thickening agent may be conveniently used in amounts between about 0.05 and 1.0 wt %, preferably between about 0.15 and 0.35 wt %. Suitable thickeners include natural gums, such as Guar gum, alginates, locust bean gum, gum arabic, ethyl cellulose products, acrylates, methacrylates, xanthan gum, finely dispersed silica gels, and magnesium or aluminum silicates.

The dispersions of the present invention may also include biocides which inhibit or suppress mold and/or bacterial growth. Suitable products include sodium pentachlorophenolate, condensation products of paraformaldehyde with aromatic alcohols, specifically benzyl alcohol and solutions of formaldehyde. These biocides may be present in amounts between 0 and 3 wt %, preferably in amounts between 0.05 and 0.5 wt %.

The dispersions of the present invention may also include the defoamers known to the dyestuff art. Included among such agents are tributyl phosphate, alkyl succinic acid anhydride combined with aliphtic alcohol, methypolysiloxane with $C_2$-$C_4$ alkoxy groups in combination with finely dispersed silica, and water insoluble organic liquids. Among the suitable water insoluble organic liquids are mineral oil, chlorinated mineral oil, liquid trichlorovinyl chloride polymers mixed with hydrophobic, finely dispersed silica and sulphonated petroleum.

Dispersions of the present invention may also include between 0 and 20%, preferably between 5 and 10 wt % of a humecant. Included among the suitable humectants known to the dyestuff art are formamide and glycol ethers.

Dispersions of the present invention will naturally include any agent used to adjust its pH desired level. Because the acid dyestuffs tend to have an acid pH in water, such agents will normally display an alkaline pH, i.e., one greater than 7, in water. A particularly suitable and convenient pH control agent is lithium hydroxide.

The dispersions of the present invention are stable, have a low viscosity at low shear rates and are readily water dilutable to apparent dye solutions. The dispersions should be stable in field storage in the sense that they do not irreversibly separate or form undispersible sediments under the temperature conditions encountered during the transport and storage of dyes by the relevant U.S. industry. This may be conveniently evaluated by oven ageing at 50° C. for three weeks. The viscosity characteristics are discussed in more detail hereinabove but should generally be such as to cause no impediment in the dispersions utilization in the dyeing operations common in the art. The dilution of these dispersions to one gram of dispersion per liter of room temperature (about 25° C.) water, preferably five grams per liter, should result in an apparent solution, i.e. a solution in which no dyestuff particles are apparent to the unaided human eye. It is particularly preferred that such solutions be obtained in three minutes or less after dilution.

EXAMPLES

The invention is further illustrated but is not intended to be limited by the following examples in which all parts and percentages are by weight, unless otherwise specified. Unless otherwise specified the formulations reported in the following working examples were prepared in the following manner:

1. An aqueous solution of a common dyestuff industry biocide and a sodium lignin sulphonate dispersant with a low sugar content, a molecular weight between about 5000 and 50,000 and 0.5 to 5 sulphonate groups per 1000 molecular weight units was prepared using the amount of these ingredients desired in the final dispersion (about 0.3 wt % of the former and 1.0 wt % of the latter except 1.5 wt % for the dye of Structure I and the reactive dye).

2. Between about 25 and 30% more of the commercially available presscake of the given dyestuff being formulated than ultimately desired was stirred into the aqueous solution of step 1.

3. The slurry obtained in step 2 was subjected to size reduction in a rotor-stator mill followed by size reduction in a pressure-cavitation mill to obtain an average particle size of between about 2 and 5 microns.

4. Sufficient water was added to adjust the dyestuffs solids (including presscake impurities) to the specified level.

5. The specified chelating agent was added and, where indicated, the solubility on the dye on water dilution of the dispersion was evaluated.

6. A sufficient amount of lithium hydroxide was added to adjust the pH of the dispersion to about 7 and, where indicated, the solubility on dilution was evaluated. In those cases in which a neutralized chelating agent was utilized no pH adjustment was made.

7. The indicated surfactant was added and the solubility on dilution was evaluated. Where indicated, the pH viscosity at 12 rpm at room temperature in the Brookfield Model LVT Viscometer was determined for the final dispersion.

8. The dyestuff solubility on water dilution of the dispersion was evaluated by visual observation. Complete solution was defined as a crystal clear solution with no visible particles evident. A high intensity light was utilized to resolve any doubt. In general, one liter of about 20° C. water was added to one gram of the dispersion and the evaluation was made after hand stirring. Where indicated, the dilution or the temperature of the diluting water was varied.

4,673,410

TABLE 1

| Example | Dyestuff[1] Identity | Amount | Chelating Agent[2] Identity | Amount | Amount of LiOH H$_2$O | Surfactant[3] Type | Amount | Time | Solubility Comments | Viscosity 12 rpm | pH |
|---|---|---|---|---|---|---|---|---|---|---|---|
| Comp 1 | Structure I | 19.6% | | | | | | | Not soluble at RT | | 6.3 |
| Comp 2 | Structure I | 19.6% | Na$_2$ EDTA | 1.0% | | | | | Not soluble at RT | | |
| Comp 3 | Structure I | 19.6% | Na hexametaphosphate | 2.0% | | | | | Soluble at 140° F. | | 7.3 |
| Comp 4 | Structure I | 19.6% | | | | Nonionic I | 1.0% | | Soluble at 140° F. | | 7.3 |
| Comp 5 | Structure I | 19.6% | | | | Nonionic I | 3.0% | | Soluble at 130° F. | | 7.3 |
| Comp 6 | Structure I | 19.6% | Na$_2$ EDTA | 8.0% | | Nonionic I | 3.0% | | Soluble at 90° F. | | |
| Comp 7 | Structure I | 19.6% | Na$_2$ EDTA | 14.0% | | Nonionic I | 1.0% | | Not soluble at RT | | |
| 1 | Structure I | 19.6% | EDTA free acid | 10.0% | 4.5% | Nonionic I | 3.0% | 0.5 min. | 8 min. at 8° C. | 3650 cps | 7.1 |
| Comp 8 | Structure I | 19.6% | EDTA free acid | 5.0% | 2.0% | | | | Not soluble at RT | 350 cps | 7.4 |
| Comp 9 | Structure I | 19.6% | EDTA free acid | 7.5% | 3.0% | | | | Not soluble at RT | | |
| Comp 10 | Structure I | 19.6% | EDTA free acid | 10.0% | 4.5% | | | | Not soluble at RT | | |
| 2 | Structure I | 19.6% | EDTA free acid | 10.0% | 4.5% | Nonionic I | 1.0% | 1 min. | | | 7.1 |
| 3 | Structure I | 19.6% | EDTA free acid | 10.0% | 4.5% | Nonionic II | 2.0% | 2 min. | | 1580 cps | |
| 4 | Structure I | 19.6% | EDTA free acid | 10.0% | 4.5% | Nonionic III | 0.5% | >3.0 min. | | | |
| 5 | Structure I | 19.6% | EDTA free acid | 10.0% | 4.5% | Anionic I | 3.0% | 4.5 min. | | | |
| 6 | Structure I | 19.6% | EDTA free acid | 10.0% | 4.5% | Nonionic IV | 2.0% | 2.0 min. | | 1000 cps | |
| 7 | Structure I | 19.6% | EDTA free acid | 10.0% | 4.5% | Nonionic V | 2.0% | 2-3 min. | | 2000 cps | |
| 8 | Structure I | 19.6% | EDTA free acid | 10.0% | 4.5% | Anionic II | 2.0% | >3.0 min. | | 1320 cps | |
| 9 | Structure I | 19.6% | EDTA free acid | 10.0% | 4.5% | Anionic III | 2.0% | >3.0 min. | | 1060 cps | |
| Comp 11 | Structure I | 19.6% | Citric acid | 10.0% | | | | | Not soluble at RT | | 2.9 |
| Comp 12 | Structure I | 19.6% | Citric acid | 10.0% | 7.0% | | | | Not soluble at RT | | 7.1 |
| Comp 13 | Structure I | 19.6% | Citric acid | 10.0% | 7.0% | Nonionic IV | 2.0% | | Only trace insolubles | | 7.1 |
| Comp 14 | Structure I | 19.6% | DETA PAA free acid | 10.0% | 12.0% | | | | Not soluble at RT | | |
| Comp 15 | Structure I | 19.6% | DETA PAA free acid | 10.0% | 12.0% | Nonionic III | 2.0% | | Not soluble at RT | | |
| Comp 16 | C.I. Acid Red 337 | 25.2% | DETA PAA free acid | 10.0% | 12.0% | | | >30 min. | Not soluble at RT | | 3.1 |
| Comp 17 | C.I. Acid Red 337 | 25.2% | EDTA free acid | 5.0% | 2.2% | | | 27 min. | | | 2.1 |
| 11 | C.I. Acid Red 337 | 25.2% | EDTA free acid | 5.0% | 2.2% | Nonionic IV | 1.0% | 4 min. | | | 7.1 |
| 12 | C.I. Acid Red 337 | 25.2% | EDTA free acid | 5.0% | 2.2% | Nonionic IV | 1.0% | 5 min. | | | |
| Comp 18 | C.I. Acid Red 337 | 25.2% | | | | | | 21 min. | | | 7.2 |
| Comp 19 | C.I. Acid Red 337 | 25.2% | | | | | | | Not soluble at RT Had 7.0% NaCl added | | 1.8 |
| 13 | C.I. Acid Red 337 | 25.2% | Citric acid | 5.0% | 3.5% | Nonionic IV | 1.0% | 5 min. | Not soluble at RT | | 7.2 |
| 14 | C.I. Acid Red 337 | 25.2% | Citric acid | 5.0% | 3.5% | Nonionic IV | 1.0% | 4 min. | | | 7.2 |
| Comp 21 | C.I. Acid Red 337 | 25.2% | Citric acid | 5.0% | | Nonionic IV | 1.0% | 20 min. | | | 3.2 |
| 15 | C.I. Acid Red 337 | 25.2% | EDTA free acid | 5.0% | | Nonionic IV | 1.0% | 15 min. | At 5 grams per liter | | |
| Comp 22 | C.I. Acid Red 266 | 26.9% | | | 2.1% | Nonionic IV | 1.0% | 3 min. | At 5 grams per liter | | 7.1 |
| Comp 23 | C.I. Acid Orange 156 | 26.9% | | | | | | | Not soluble at RT | | 8.4 |
| 16 | C.I. Acid Orange 156 | 26.5% | EDTA free acid | 5.0% | 2.1% | Nonionic IV | 1.0% | 70 min. | | | 3.3 |
| 17 | C.I. Acid Orange 156 | 26.5% | EDTA free acid | 5.0% | 2.1% | Nonionic IV | 1.0% | 9 min. | | | 7.0 |
| Comp 24 | C.I. Acid Orange 156 | 26.5% | EDTA free acid | 5.0% | | Nonionic IV | 1.0% | 2 min. | | | 7.0 |
| 18 | C.I. Acid Orange 156 | 26.5% | Citric acid | 5.0% | 3.5% | Nonionic IV | 1.0% | 12 min. | | | 1.9 |
| 19 | C.I. Acid Orange 156 | 26.5% | Citric acid | 5.0% | 3.5% | Nonionic IV | 1.0% | 2.5 min. | Not soluble at RT | | 7.2 |
| Comp 26 | C.I. Acid Orange 156 | 26.5% | Citric acid | 5.0% | | Nonionic IV | 1.0% | 4 min. | | | 7.2 |
| Comp 27 | C.I. Acid Orange 156 | 26.5% | LiCl | 2.1% | | Nonionic IV | 1.0% | 4 min. | | | |
| 20 | C.I. Acid Orange 156 | 26.5% | EDTA free acid | 5.0% | 8.9% TEA (triethanolamine) | Nonionic IV | 1.0% | 2.5 min. | | | |
| Comp 28 | C.I. Acid Orange 156 | 26.5% | DETA PAA free acid | 5.0% | | | | 29 min. | 6 min. at 5 grams per liter | | 2.5 |
| 21 | C.I. Acid Orange 156 | 26.5% | DETA PAA free acid | 5.0% | 1.8% | | | | Not soluble at RT | | 7.2 |

4,673,410

TABLE 1-continued

| Example | Dyestuff[1] Identity | Dyestuff Amount | Chelating Agent[2] Identity | Chelating Agent Amount | Amount of LiOH H$_2$O | Surfactant[3] Type | Surfactant Amount | Time | Solubility Comments | Viscosity 12 rpm | pH |
|---|---|---|---|---|---|---|---|---|---|---|---|
| 22 | C.I. Acid Orange 156 | 26.5% | DETA PAA free acid | 5.0% | 1.8% | Nonionic IV | 1.0% | 4.5 min. | | | 7.2 |
| Comp 29 | C.I. Acid Orange 156 | 26.5% | | | | | | | Not soluble at RT had 2.7% NaCl added | | |
| 23 | C.I. Acid Orange 156 | 26.5% | EDTA free acid | 5.0% | 2.1% | Anionic II | 1.0% | 6 min. | | | |
| 24 | C.I. Acid Orange 156 | 26.5% | EDTA free acid | 5.0% | 2.1% | Nonionic II | 1.0% | 3.5 min. | | | |
| Comp 30 | C.I. Reactive Yellow III | 15.0% | | | | | | | Not soluble at RT with 15% NaCl added at 10 g/l | | |
| 25 | C.I. Reactive Yellow III | 15.0% | EDTA free acid | 3.0% | 1.5% | Anionic IV | 1.0% | 40 min. | Tested at 10 grams per liter with 15% NaCl added | | |

Footnotes:

[1] Dyestuffs are identified by Color Index Classification except for "Structure I" which has the following structural formula:

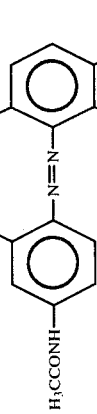

[2] The chelating agents used were coded as follows:
Na$_2$ EDTA - disodium salt of ethylene diamine tetraacetic acid
Na hexametaphosphate - sodium hexametaphosphate
EDTA free acid - ethylene diamine tetraacetic acid
DETA PAA free acid - diethylene triamine pentaacetic acid

[3] The surfactants used were coded as follows:
Nonionic I - oleyl alcohol ethoxylated with 20 mols ethylene oxide
Nonionic II - polyethoxylated fatty alcohol
Nonionic III - 2,4,7,9-tetramethyl decynediol ethoxylated with 30 mols of ethylene oxide
Nonionic IV - nonylphenyl ethoxylated with 9.5 mols of ethylene oxide
Nonionic V - a block copolymer from ethylene oxide and propylene oxide
Anionic I - sodium salt of sulphonated dioctyl succinate
Anionic II - sodium N methyl N oleyl taurate
Anionic III - sodium alkyl naphthalene sulphonate

EXAMPLE 26

A dispersion was prepared in the same manner as outlined for Table I except that it was prepared using commercial size batches, i.e. 5000 to 18,000 lbs. It had the following final composition:

| | |
|---|---|
| Dye of Structure I (presscake) | 19.6% |
| sodium lignin sulphonate | 1.5% |
| biocide | 0.3% |
| ethylene diamine tetraacetic acid | 10.0% |
| lithium hydroxide monohydrate | 4.5% |
| ethoxylated nonylphenol (9.5 mols E.O.) | 0-0.7% |
| water | balance |

The final dispersion had a room temperature viscosity at 12 rpm of less than 2000 cps which was adjusted to between 2000 and 3000 by the addition of a xanthan gum thickener. When diluted at the rate of 5 grams of dispersion per liter of room temperature water, the dispersed dye readily dissolved leaving no visible particles in less than three minutes. On three successive batches, the amount of surfactant added was 0.7%, 0.0% and 0.1%, respectively. The pH for each batch was about 7.

These commercial batches were successfully used in the commercial dyeing of nylon carpet. In particular, these dispersions were diluted down to the desired application strength with room temperature water and combined with other dyes to make up the desired shades. The apparently dissolved dyes were then sprayed on nylon carpet in the manner common in the industry. The resultant dyeings were uniform even on carpets made from fast striking nylon which can fix some dye at room temperature. The use of a similar dispersion which did not contain a solubility enhancer (the ethylene diamine tetraacetic acid and lithium hydroxide) had given non-uniform dyeings in which the dispersed dye had failed to dye the tips of the carpet fibers.

EXAMPLE 27

A dispersion was prepared using the procedure outlined for Table I using the following composition:

| | |
|---|---|
| Color Index Acid Orange 156 presscake | 26.5% |
| sodium lignin sulphonate | 1.0% |
| biocide | 0.3% |
| ethylene diamine tetraacetic acid | 2.0% |
| lithium hydroxide monohydrate | 0.8% |
| ethoxylated nonylphenol (9.5 mol E.O.) | 1.0% |
| water | balance |

The final dispersion had a room temperature viscosity at 12 rpm of less than 2000 cps. It also had a pH of about 7. On adding a liter of room temperature water to five grams of the dispersion, all of the dispersed dyestuff dissolved within 3 minutes leaving no particles visible to the unaided human eye.

EXAMPLE 28

A dispersion was prepared using the procedure outlined for Table I using the following composition:

| | |
|---|---|
| Color Index Acid Red 337 presscake | 25.2% |
| sodium lignin sulphonate | 1.0% |
| biocide | 0.3% |
| ethylene diamine tetraacetic acid | 7.0% |
| lithium hydroxide monohydrate | 3.1% |
| ethoxylated nonylphenol (9.5 mols E.O.) | 1.0% |
| water | balance |

The final dispersion had a room temperature viscosity at 12 rpm of less than 2000 cps. It also had a pH of about 7. On adding a liter of room temperature water to five grams of the dispersion all of the dispersed dyestuff dissolved within three minutes leaving no particles visible to the unaided human eye.

EXAMPLE 29

The technology of the present invention was compared to that of European Pat. No. 57,158 and U.S. Pat. No. 4,465,491. Example 13 of the European patent was essentially repeated and compared to the results obtained by changing the formulation to more closely approximate the requirements of the present invention. Four formulations were prepared by blending the components in a Wharing blender. The "blended" compositions wherein the dyestuff had an average particle size of about 6.4 microns were tested by filtration after appropriate dilution with 25° C. tap water. The "blended" compositions were then ground in a glass bead mill for about five minutes which gave an average particle size of between about 1.3 and 1.4 microns. The milled slurries were then spray dried and evaluated by filtration after appropriate dilution with 25° C. water.

The filtration tests were conducted in a manner similar to that outlined in Example 13 of European Pat. No. 57,158. One liter of 25° C. tap water was added to the specified amount of dyestuff formulation and stirred by hand with a polypropylene stirring rod for three minutes. The mixture was filtered using two thicknesses of filter paper, a Buechner funnel and a vacuum of between about 20 and 25 inches of mercury. After it was determined that all four compositions would pass the test at ten grams per liter "blended" and thirty grams per liter "milled and spray dried" using 1450 CV filter paper the evaluation was conducted using a much finer pore size filter paper, Watman Number 2. This gave a better measure of the solubility of the compositions since a true molecular solution will pass through any filter paper that the solvent passes through.

The maximum filterable concentration for the three alternative compositions was determined by comparison to the composition of said Example 13. The maximum concentration at which this composition would filter in a reasonable time in both states ("blended" and "milled and spray dried") was determined. The concentration of an alternative composition giving the same amount of filter residue by visual inspection was then taken as the maximum filterable concentration for that composition. The results were as follows:

| | Formulation | Maximum Filterable Concentration | |
|---|---|---|---|
| | | Blended | Milled and Spray Dried |
| (1) | 50 parts C.I. Direct Black 19 | 5 grams/liter | 10 grams/liter |

|   | Formulation | Maximum Filterable Concentration | |
|---|---|---|---|
|   |   | Blended | Milled and Spray Dried |
|     | 40 parts sodium sulfate | | |
|     | 10 parts tetrasodium salt of EDTA | | |
| (2) | 50 parts C.I. Direct Black 19 | 5 grams/liter | 10 grams/liter |
|     | 50 parts sodium sulfate | | |
| (3) | 50 parts C.I. Direct Black 19 | 10 grams/liter | 30 grams/liter |
|     | 10 parts ethylene diamine tetraacetic acid (EDTA) | | |
|     | 4.6 parts lithium hydroxide monohydrate | | |
|     | 35.4 parts cerelose | | |
| (4) | 50 parts C.I. Direct Black 19 | 10 grams/liter | |
|     | 50 parts cerelose | | |

Lack of material prevented a more precise evaluation of Formulation 4. It is believed it would have passed the test at five grams per liter.

These results demonstrate that the technology of these patents (European Pat. No. 57,158 and U.S. Pat. No. 4,465,491) are concerned with obtaining an apparent solubility of a lesser order than that obtained by the present invention. In this regard, the dispersion of Example 26 was found to pass through Watman Number 2 filter paper with almost no residue after dilution to three grams per liter. This was expected because the visible solubility test specified in the present application is believed to be considerably more stringent than filtration with even the very fine pored Watman Number 2 paper.

The difference between these three evaluation techniques was further demonstrated with the dispersion of Example 17 of U.S. Pat. No. 4,468,230. This dispersion had an average dispersed dyestuff particle size of 2 microns and the following formulation:

| Dye of Structure I | 19.3 parts |
|---|---|
| Sodium chloride (including that from presscake) | 10.5 parts |
| Sodium lignin sulphonate | 1.5 parts |
| Water | balance. |

Upon dilution with one liter of room temperature water, three grams of this dispersion readily passed through 1450 CV paper without significant residue but required overnight to pass through a Watman Number 2 filter paper and left a heavy residue. This dispersion did not display visual solubility at a dilution three times as great, i.e. at one gram per liter.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A non-sedimenting, stable concentrated aqueous dye dispersion having superior cold water solubility comprising
   (a) between about 10 and 60 weight percent of a water-soluble dyestuff with at least one anionic water solubilizing group and with an average particle size of between about 1 and 5 microns,
   (b) a sufficient amount of a lithium or ammonium salt of a chelating agent to give the dispersion a three-minute visual solubility in 25° C. distilled water of at least about 5 grams per liter, and
   (c) sufficient water to give the dispersion a room temperature viscosity of less than about 4000 cps measured with a Brookfield viscometer at 12 rpm, said dispersion having a pH of greater than about 5.

2. The dye dispersion of claim 1 wherein the chelating agent carries at least one of a free carboxylic acid group or a lithium or ammonium carboxylate group.

3. The dye dispersion of claim 2 wherein the chelating agent is an amino carboxylic acid or a hydroxy carboxylic acid.

4. The dye dispersion of claim 1 or 2 or 3 wherein the salt is a lithium salt.

5. The dye dispersion of claim 1 or 2 or 3 wherein the dispersion contains between about 0.1 and 5 weight percent of a non-ionic surfactant.

6. The dye dispersion of claim 5 wherein the non-ionic surfactant is an ethoxylated compound.

7. The dye dispersion of claim 1 or 2 or 3 wherein there is between about 1 and 20 weight percent of chelating agent present.

8. A non-sedimenting, stable concentrated aqueous dye dispersion having superior cold water solubility comprising
   (a) between about 10 and 60 weight percent of a water-soluble dyestuff with at least one anionic water-solubilizing group and with an average particle size between about 1 and 5 microns and no substantial portion of particles with a size less than about 1 micron,
   (b) a sufficient amount of a lithium or ammonium salt of a chelating agent to give the dispersion a three-minute visual solubility in 25° C. distilled water of at least 5 grams per liter,
   (c) a sufficient amount of an anionic dispersant to prevent substantial reagglomeration of the dyestuff particles during reduction to the 1 to 5 micron range, and
   (d) sufficient water to give the dispersion a room temperature viscosity of less than about 4000 cps measured with a Brookfield viscometer at 12 rpm, said dispersion having a pH greater than about 5.

9. The dispersion of claim 8 wherein the anionic water-solubilizing group is a sulfonic acid salt.

10. The dispersion of claim 9 wherein the chelating agent carries at least one of a free carboxylic acid group or a lithium or ammonium carboxylate group.

11. A process for the production of a non-sedimenting stable aqueous dye dispersion having superior cold water solubility comprising
   (a) mixing a dye carrying at least one sodium or potassium salt solubilizing group with water and sufficient anionic or nonionic dispersant to keep the dye particles from reagglomerating upon size reduction,
   (b) reducing the particle size of the dye to give an average particle size of between about 1 and 5 microns with no substantial portion of the particles having a size less than about 1 micron, (c) adding a sufficient amount of a lithium or ammonium salt of a chelating agent to give the dispersion a three minute visual solubility in 25° C. distilled water of at least about 5 grams per liter, (d) adding sufficient water to give the dispersion a room temperature viscosity of less than about 4000 cps measured with a Brookfield viscometer at 12 rpm, and (e) adjusting the pH of said dispersion to a value greater than about 5.

12. The process of claim 11 wherein the dye is mixed with water containing a dispersant and subjected to size reduction before the addition of said lithium or ammonium salt.

13. The process of claim 12 wherein the dispersant present before size reduction is anionic.

14. The process of claim 13 wherein the dispersant present before size reduction is a lignin sulphonate.

15. The process of claim 13 wherein a nonionic dispersant is added to the dispersion after the size reduction.

* * * * *